(12) United States Patent
Kibler

(10) Patent No.: US 9,771,012 B2
(45) Date of Patent: Sep. 26, 2017

(54) ROLL OFF TRAILER HAVING A STEPPED OUT FRONT END OR NECK

(71) Applicant: MAC TRAILER MANUFACTURING, INC., Alliance, OH (US)

(72) Inventor: Scott A. Kibler, Kensington, OH (US)

(73) Assignee: MAC TRAILER MANUFACTURING, INC., Alliance, OH (US)

( * ) Notice: Subject to any disclaimer, the term of this patent is extended or adjusted under 35 U.S.C. 154(b) by 56 days.

(21) Appl. No.: 14/844,729

(22) Filed: Sep. 3, 2015

(65) Prior Publication Data

US 2016/0068093 A1   Mar. 10, 2016

Related U.S. Application Data

(60) Provisional application No. 62/045,842, filed on Sep. 4, 2014.

(51) Int. Cl.
*B62D 53/06* (2006.01)
*B60P 1/64* (2006.01)
*B62D 21/20* (2006.01)

(52) U.S. Cl.
CPC ............ *B60P 1/649* (2013.01); *B60P 1/6454* (2013.01); *B62D 21/20* (2013.01); *B62D 53/061* (2013.01)

(58) Field of Classification Search
CPC ........ B60P 1/649; B60P 1/6454; B62D 21/20; B62D 53/061; B62D 53/08
USPC ...................................................... 280/423.1
See application file for complete search history.

(56) References Cited

U.S. PATENT DOCUMENTS

| | | | | |
|---|---|---|---|---|
| 2,722,433 A * | 11/1955 | Shinn | ................... | B62D 53/061 280/417.1 |
| 2,789,714 A * | 4/1957 | Norris | ................... | B62D 53/065 280/441.2 |
| 3,587,890 A * | 6/1971 | Hyland | ................. | E04G 21/161 238/13 |
| 4,511,303 A * | 4/1985 | O'Neill | ................... | B60P 1/025 414/458 |
| 4,938,524 A * | 7/1990 | Straub | .................... | B61D 17/10 280/423.1 |
| 4,988,258 A * | 1/1991 | Lutz | ......................... | B60R 19/56 293/118 |
| 5,088,875 A * | 2/1992 | Galbreath | ............. | B60P 1/6454 280/405.1 |
| 5,215,426 A * | 6/1993 | Bills, Jr. | ................... | B60P 1/43 414/537 |
| 5,322,314 A * | 6/1994 | Blum | ...................... | B62D 21/20 280/400 |
| 5,967,735 A | 10/1999 | Smart et al. | | |
| 8,371,599 B2 * | 2/2013 | Duvall | ..................... | B60D 1/01 280/402 |
| 8,662,525 B1 * | 3/2014 | Dierks | ...................... | B62B 1/00 280/142 |
| 2001/0030431 A1 | 10/2001 | Killday | | |
| 2008/0036176 A1 * | 2/2008 | Schuettenberg | ......... | B60D 1/00 280/476.1 |
| 2008/0157504 A1 * | 7/2008 | Schuettenberg | ......... | B60D 1/00 280/402 |

* cited by examiner

*Primary Examiner* — Jacob Knutson
*Assistant Examiner* — Michael Stabley
(74) *Attorney, Agent, or Firm* — Sand & Sebolt

(57) ABSTRACT

A roll off trailer having a stepped out neck is provided. The trailer frame may be formed largely of an aluminum alloy or other metal.

19 Claims, 10 Drawing Sheets

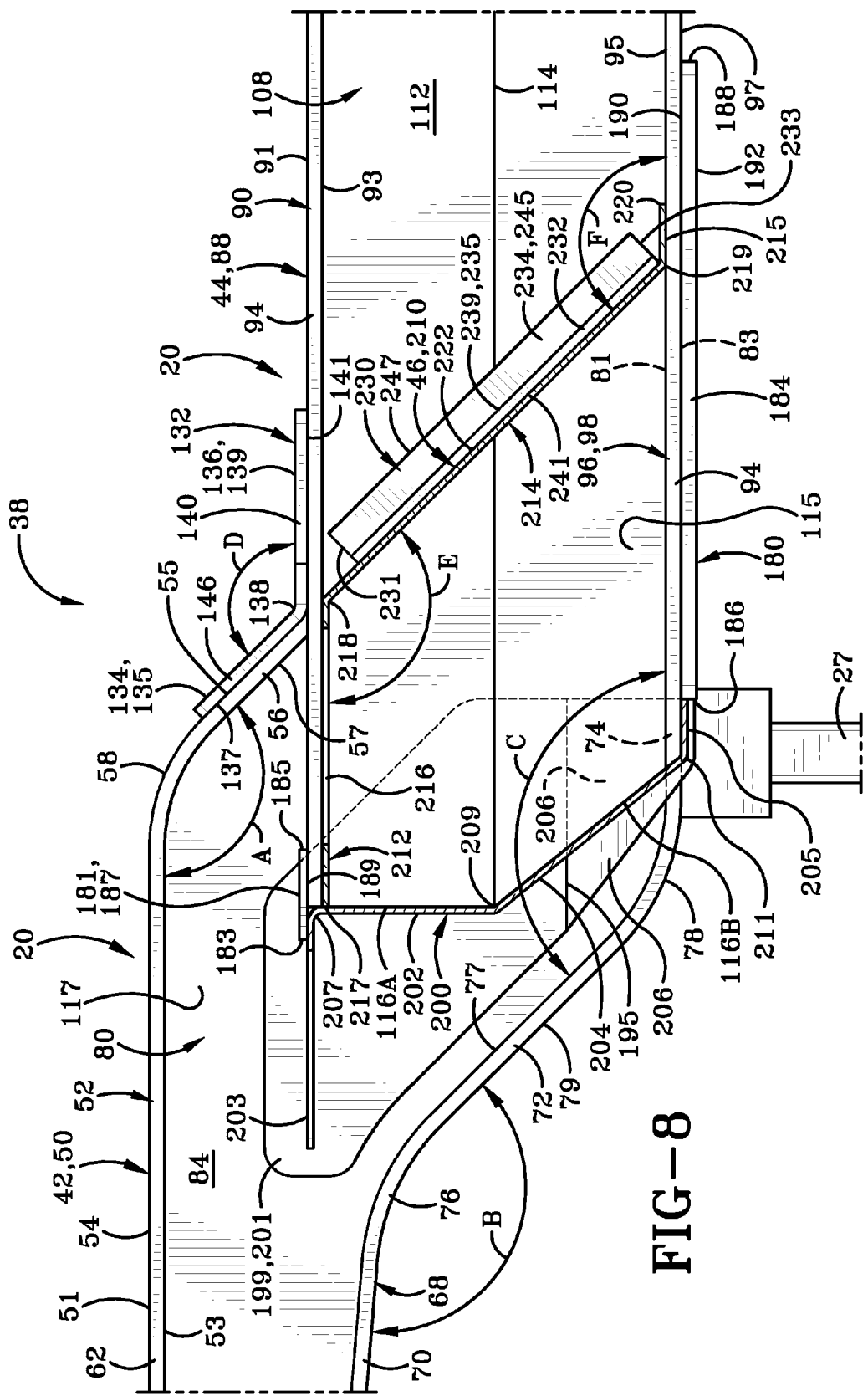

ROLL OFF TRAILER HAVING A STEPPED OUT FRONT END OR NECK

CROSS REFERENCE TO RELATED APPLICATION

This application is a non-provisional application of U.S. Provisional Patent Application Ser. No. 62/045,842, filed Sep. 4, 2014, the disclosure of which is incorporated herein by reference.

BACKGROUND

Technical Field

The technical field relates generally to trailers used for hauling containers, such as roll off trailers. The technical field may relate to a roll off trailer which may be manufactured primarily out of aluminum and have a stepped out front neck.

Background Information

Roll off trailers are known in the art and include a frame having a forward end having a hitch attachment for attaching to a tractor vehicle and a rear end including a suspension assembly and ground engaging wheels for engaging a road surface. The roll off trailers include a tabletop capable of pivoting upwards to draw a container stored or disposed in a grounded position onto the table frame and hauled away when the trailer is connected to the tractor vehicle.

Conventional roll off trailers are constructed from heavy steel, which is ordinarily assumed necessary to support the weight of the containers hauled on the tabletop of the trailer. These steel frame roll off trailers are rather heavy. Thus, a need exists for a lighter weight roll off trailer and for improved frame construction for a stepped out neck.

SUMMARY

In one aspect, a trailer may comprise a trailer frame front section comprising left and right front longitudinal rails respectively having left and right sides defining therebetween a front section outer width; a trailer frame rear section comprising left and right rear longitudinal rails respectively having left and right sides defining therebetween a rear section outer width which is smaller than the front section outer width; a first front flange of the left front rail; a first rear flange of the left rear rail which extends to the right of the first front flange; and a first connector plate which extends between and is secured to the first front flange and the first rear flange.

In another aspect, a trailer may comprise a trailer frame front section comprising left and right front longitudinal rails respectively having left and right sides defining therebetween a front section outer width; a trailer frame rear section comprising left and right rear longitudinal rails respectively having left and right sides defining therebetween a rear section outer width which is smaller than the front section outer width, the left and right rear rails having respective front ends; a trailer frame neck section which extends adjacent the front ends of the rear rails and comprises a neck section plate which extends downward from adjacent an upper end of the neck section plate to adjacent a lower end of the neck section plate and which extends from adjacent the left rear rail to adjacent the right rear rail; and a left bracket which extends between and is secured to the left rear rail and the neck section plate.

In another aspect, a trailer may comprise a trailer frame front section comprising left and right front longitudinal rails respectively having left and right sides defining therebetween a front section outer width, the left front rail having a rear end; a trailer frame rear section comprising left and right rear longitudinal rails respectively having left and right sides defining therebetween a rear section outer width which is smaller than the front section outer width, the left rear rail comprising a web; a flange of the left front rail comprising a flange segment which extends adjacent the rear end of the left front rail and which extends downward from adjacent an upper end of the flange segment to adjacent a lower end of the flange segment; and a left bracket which extends between and is secured to the flange segment and the web of the left rear rail.

BRIEF DESCRIPTION OF THE SEVERAL VIEWS OF THE DRAWINGS

A sample embodiment is set forth in the following description, is shown in the drawings and is particularly and distinctly pointed out and set forth in the appended claims.

FIG. 8 is an enlarged cross-sectional view taken on line 8-8 of FIG. 2 shoring portions of the stepped out neck region.

Similar numbers refer to similar parts throughout the drawings.

DETAILED DESCRIPTION

Figure 1:
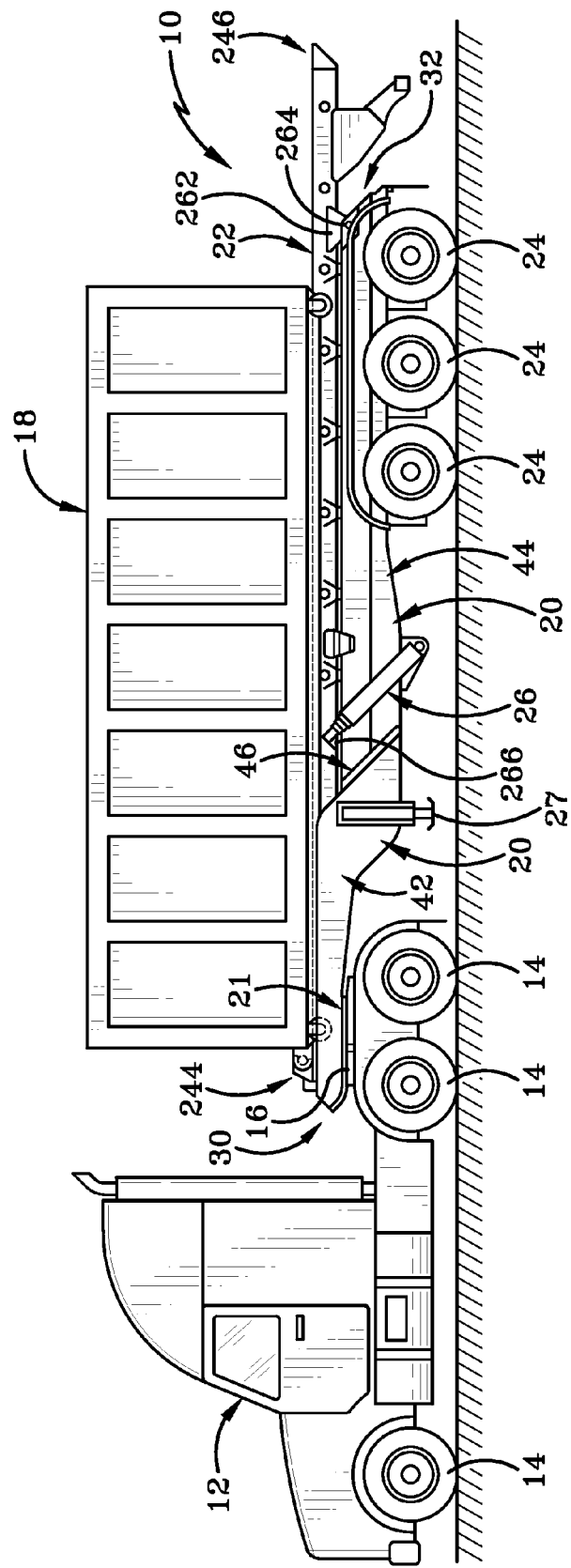
FIG. 1 is a side elevation view of a roll off trailer having a stepped out neck with the table in a home position and a container atop the table.
Figure 1A:
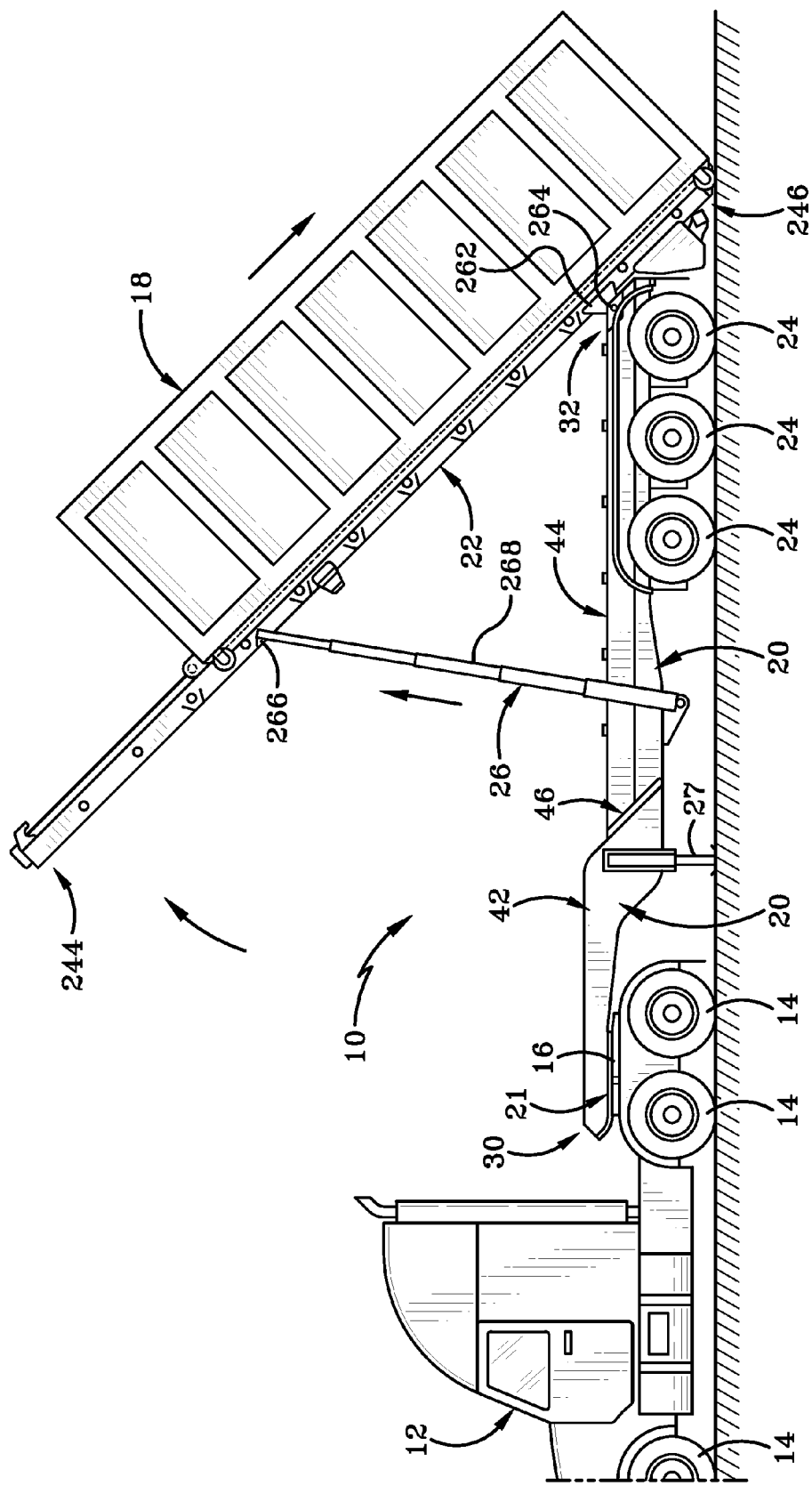
FIG. 1A is a side elevation view of the trailer with the table in a tilted roll off position showing a stage of unloading the container.
Figure 4:
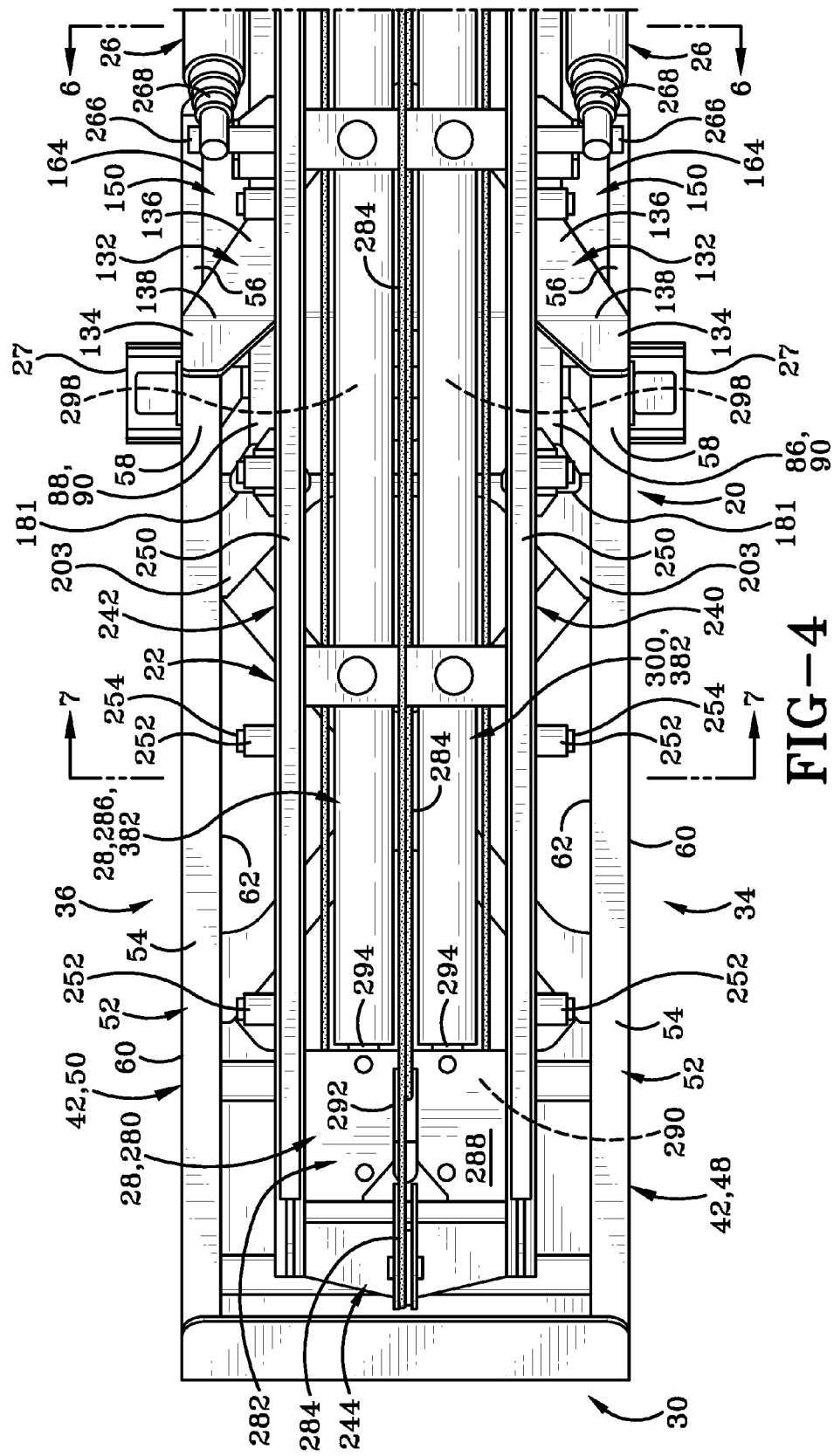
FIG. 4 is an enlarged top view of the front section of the trailer frame.

As depicted in FIG. 1, a roll off trailer 10 is configured to be towed by a towing vehicle or truck 12 having rotatable ground engaging wheels 14 when hitched to the towing vehicle by a fifth wheel assembly or other suitable hitch member 16 of the towing vehicle 12. Trailer 10 may be configured to carry a container or box 18 thereon. Trailer 10 may include a rigid trailer frame 20, a rigid container engaging platform or tabletop 22, a suspension and wheel assembly which is along a rear portion of trailer frame 20 and includes a plurality of ground engaging wheels 24 rotatably mounted on frame 20, a pair of hydraulic lift arms 26, and a container-moving hydraulic system 28 (FIG. 4).

Figure 2:
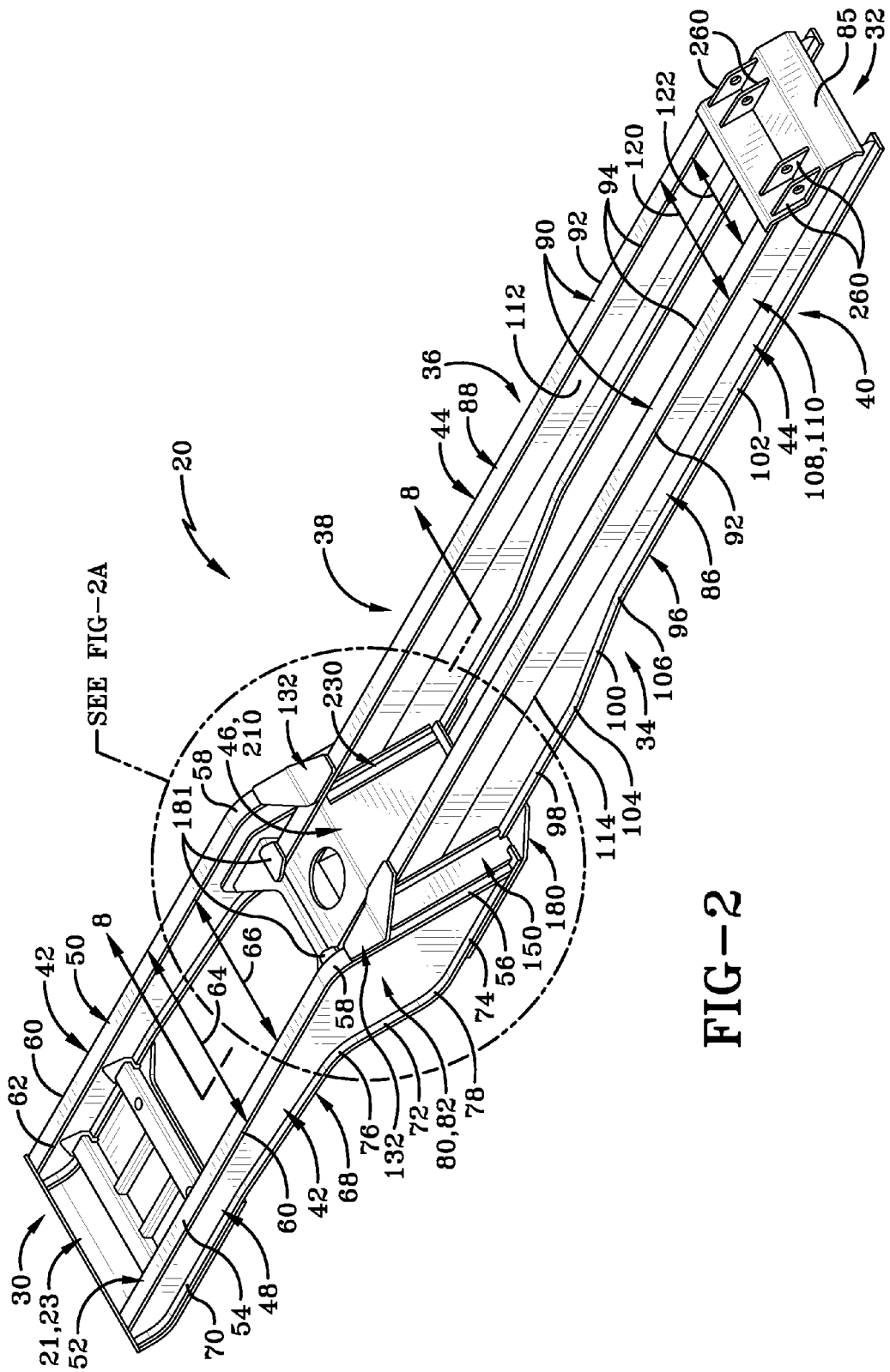
FIG. 2 is a perspective view of a trailer frame of the trailer.

Referring primarily to FIG. 2, trailer frame 20 has a forward end 30 and a rear end 32 that define therebetween a longitudinal direction, left and right sides 34 and 36 that define therebetween an axial or lateral direction, a top 38 and a bottom 40. Frame 20 may include a trailer frame front section 42 and a trailer frame rear section 44 connected or secured to front section 42 along a stepped out neck comprising a trailer frame neck section 46 of frame 20, which allows container 18 to be positioned substantially forward atop trailer 10.

Front section 42 may include left and right longitudinal rails 48 and 50 which may be elongated in the longitudinal direction, and which may be laterally spaced from and parallel to each other. Rails 48 and 50 may be essentially identical, whereby description of the components of one rail may be essentially the same as for the other rail. Rails 48 and 50 may be formed primarily of aluminum.

Figure 3:
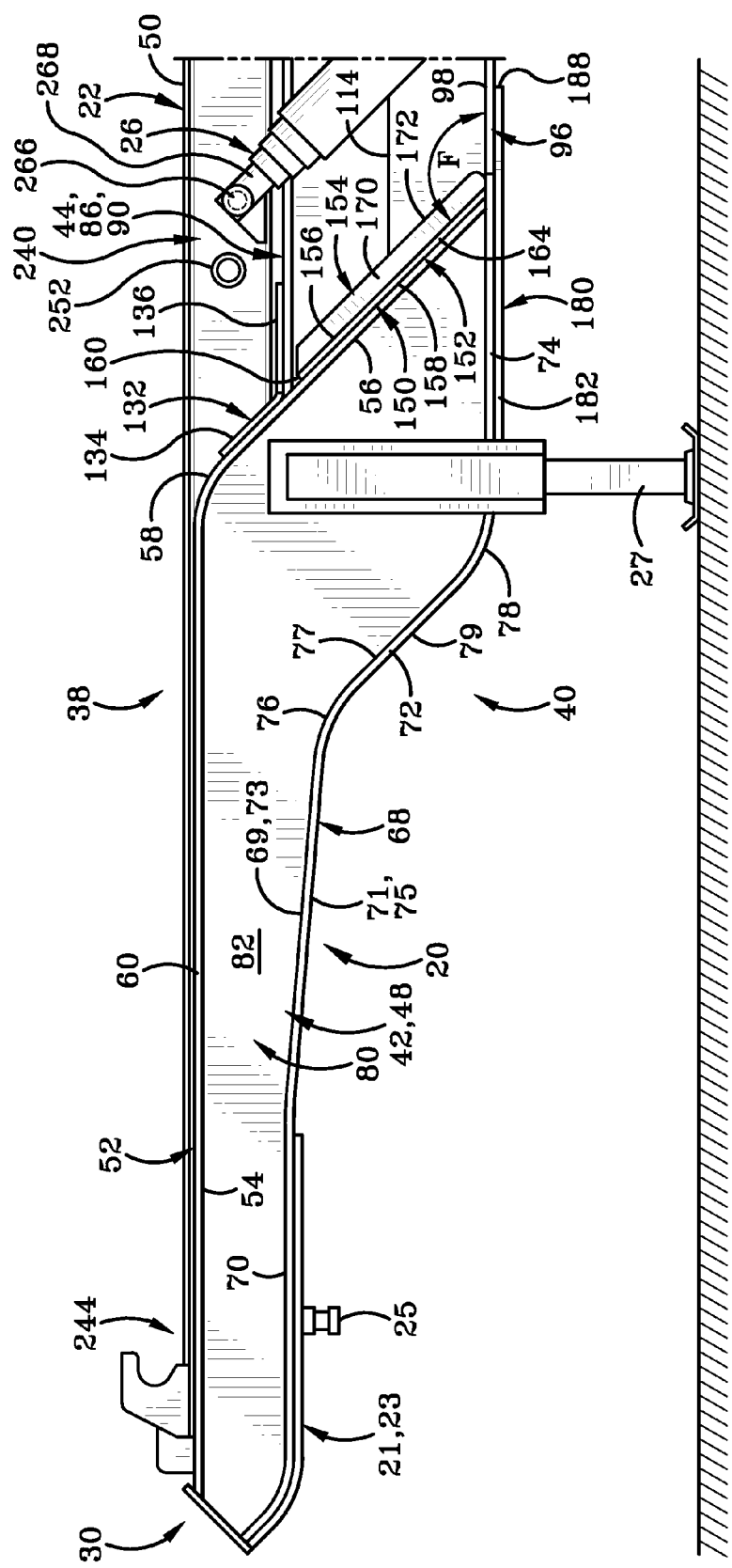
FIG. 3 is an enlarged side view of the front section of the trailer frame.

Front section 42 may include a hitch section 21 adjacent front end 30. Hitch section 21 may include a rigid body or structure 23 which extends between and is secured to rails 48 and 40 adjacent front ends thereof. Hitch section 21 may also include a hitch member 25 (FIG. 3) which may be secured to body 23 and extend downwardly therefrom. Hitch member 25 may be connected or hitched to hitch member 16 of vehicle 12 to hitch trailer 10 to vehicle 12 and allow vehicle 12 to tow trailer 10, and disconnected or unhitched from hitch member 16 whereby trailer may be separated from vehicle 12. Landing gear 27 may be mounted on frame 20, such as on front section 42, to support the front end of trailer 10 on the ground when trailer 10 is detached from truck 10 and land gear are in a lowered position, such as shown in FIG. 3. Landing gear 27 may be moved to a raised position (FIG. 1) to allow vehicle 12 to pull trailer 10.

Each rail 48 and 50 may include a longitudinally elongated web 80, an upper flange 52 secured to a top, top edge or upper edge of web 80 and a lower flange 68 secured to a bottom, bottom edge or lower edge of web 80. Web 80 may be L-shaped as viewed from the side. Upper flange 52 may be L-shaped as viewed from the side and lower flange 68 may be S-shaped as viewed from the side. Upper flange 52 may be secured to the top edge of web 80 by an L-shaped weld. Lower flange 68 may be secured to the bottom edge of web 80 by an S-shaped weld. Web 80 may extend between the lower surface of flange 52 and the upper surface of flange 68. Web 80 may be essentially vertical and have an outwardly facing surface 82 and an inwardly facing surface 84 such that surfaces 82 and 84 may be essentially vertical. Surfaces 82 and 84 of left rail 48 are respectively a leftward facing left surface and a rightward facing right surface, while surfaces 82 and 84 of right rail 48 are respectively a rightward facing right surface and a leftward facing left surface.

Upper flange 52 may include a forward or front segment 54 which is longitudinally elongated and may be essentially horizontal as viewed from the side. Segment 54 has an upwardly facing top surface 51 and a downwardly facing bottom surface 53, each of which may be essentially horizontal. Flange 52 may also include a rear segment 56 that extends downward and rearward from a rear end of front segment 54. Rear segment 56 may be essentially straight and angle downward and rearward from adjacent a front/upper end of segment 56 to a rear/lower end of segment 56. Segments 54 and 56 may be connected by a short rounded connector segment or bend 58 of flange 52. Rear segment 56 may have a top or upper surface 55 that faces upward and rearward and a bottom or lower surface 57 that faces downward and forward. Lower surfaces 53 and 57 may define therebetween an angle A (FIG. 8) which may be an obtuse angle, i.e., greater than 90 degrees and less than 180 degrees. Angle A may be in a range of about 120, 125 or 130 to 140, 145 or 150 degrees. Flange 52 has outer and inner edges 60 and 62 which may define therebetween a width of first flange 52. Outer edge 60 and inner edge 62 of flange 52 of left rail 48 are respectively left and right edges, while outer edge 60 and inner edge 62 of flange 52 of right rail 50 are respectively right and left edges.

Front section 42 may have an outer width 64 defined between the left side of front left rail 48 and the right side of front right rail 50. Outer width 64 may be defined between outer or left edge 60 of left front rail 48 flange 52 and outer or right edge 60 of right front rail 50 flange 52. Section 42 may have an inner width 66 defined between inner edge 62 of left rail 48/flange 52 to inner edge 62 of right rail 50/flange 52.

S-shaped flange 68 may be positioned directly below upper flange 52 and may include a forward segment 70, an angled middle or intermediate segment 72, and a rear segment 74. The rear end of forward segment 70 may be connected to the upper/front end of angled segment 72 by a short forward arcuate connector segment or bend 76 of flange 52. The lower/rear end of angled segment 72 may be connected to the forward end of rear segment 74 by a short rearward arcuate connector segment or bend 78 of flange 52 which may be rearward of and lower than forward segment or bend 76. Bend 58 and the rear segment 56 in its entirety including its front and rear ends may be rearward of bend 78. Angled segment 56 may in its entirety be directly above rear segment 74 of S-shaped flange 68. Segments 70, 72 and 76 may in their entirety be forward of rear segment 56 and bend 58.

S-shaped flange 68 may have an outer edge 65 and an inner edge 67. Outer edge 65 and inner edge 67 of front left rail 48 are respectively left and right edges, whereas outer edge 65 and inner edge 67 of front right rail 50 are respectively right and left edges. Flange 68 has a top surface 69 which faces generally upward and a bottom surface 71 which faces generally downward. Forward segment 70 may have an upwardly facing top surface 73 and a downwardly facing bottom surface 75, each of which may be essentially horizontal as viewed from the side. Angled segment 72 may have a top surface 77 which faces upward and rearward and a downwardly facing bottom surface 79 which faces downward and forward. Rear segment 74 may have an upwardly facing top surface 81 and a downwardly facing bottom surface 83, each of which may be essentially horizontal as viewed from the side. Bottom surfaces of 75 and 79 may define therebetween an angle B which may be an obtuse angle. Angle B may be in a range of about 120, 125 or 130 to 140, 145 or 150 degrees. Top surfaces 77 and 81 may define therebetween an angle C, which may be an obtuse angle. Angle C may be in a range of about 120, 125 or 130 to 140, 145 or 150 degrees. The lower rear end of segment 56 of L-shaped flange 52 may be closely adjacent or in contact with upper surface 81 of flange segment 74 of S-shaped flange 68 and may be adjacent the rear end of front frame section 42.

Rear section 44 may include left and right longitudinal rails 86 and 88 which may be elongated in the longitudinal direction, and which may be laterally spaced from and parallel to each other. Rear section 44 may also include a rigid rear cross structure 85 which may extend between and be secured to rails 86 and 88 adjacent the rear ends thereof and rear end 32 of frame 20. Cross structure 85 may also be referred to as a pivot mount for pivotally mounting thereon tabletop 22. Pivot mounts 260 may be secured to cross structure 85 and may in the form of essentially vertical plates. Each plate 260 may define an aperture configured to receive therein a pivot pin for pivotally mounting table 22 on frame 20.

Rails 86 and 88 may be essentially identical, whereby description of the components of one rail may be essentially the same as for the other rail. Rails 86 and 88 may be in the form of I-beams and may be formed primarily of aluminum. Each rail 86 and 88 may include a longitudinally elongated web 108, an upper flange 90 secured to a top, top edge or upper edge of web 108 and a lower flange 96 secured to a bottom, bottom edge or lower edge of web 108.

Each rail 86 and 88 may have upper and lower rail sections which are secured to one another by a longitudinal weld 114 which may be essentially horizontal and which may extend from adjacent the front end of the given rail 86, 88 to adjacent the rear end of the given rail 86, 88. The upper rail section may include upper flange 90 and an upper portion of web 108 such that the upper rail section has T-shaped cross section. The lower rail section may include lower flange 96 and a lower portion of web 108 such that the lower rail section has an inverted T-shaped cross section. Weld 114 may extend along the top edge of the lower portion of web 108 and the bottom edge of the upper portion of web 108. Rails 86 and 88 may thus have an I-beam configuration. Rails 86 and 88 may also be formed as I-beams in other fashions known in the art, for instance having a one-piece web with flanges 90 and 96 welded to the top and bottom of the web.

Web 108 may have a front section which is vertically wider than a rear section thereof. Upper flange 90 may be essentially horizontal as viewed from the side from the front end thereof to the rear end thereof and from adjacent the front end of the given rail 86, 88 to adjacent the rear end of the given rail 86, 88. Upper flange 90 may have an upwardly facing top or upper surface 91 and a downwardly facing bottom or lower surface 93. Lower flange 96 may have an upwardly facing top or upper surface 95 and a downwardly facing bottom or lower surface 97. Flange 96 may have an outer edge 99 and an inner edge 101. Outer edge 99 and inner edge 101 of left rear rail 86 are respectively left and right edges, whereas outer edge 99 and inner edge 101 of right rear rail 88 are respectively right and left edges.

Lower flange 96 may include a forward or front segment 98, a middle or intermediate segment 100 and a rear segment 102. Bottom surface 97 of front segment 98 and bottom surface 83 of front rail flange segments 74 may be essentially coplanar. Upper flange 90 may be secured to the top edge of web 108 and lower flange 96 may be secured to the bottom edge of web 108. Web 108 may extend between the lower surface 93 of flange 90 and the upper surface 95 of flange 96. Web 108 may be essentially vertical and have an outwardly facing surface 110 and an inwardly facing surface 112 such that surfaces 110 and 112 may be essentially vertical. Surfaces 110 and 112 of left rail 86 are respectively a leftward facing left surface and a rightward facing right surface, while surfaces 110 and 112 of right rail 88 are respectively a rightward facing right surface and a leftward facing left surface.

The rear end of front segment 98 may be connected to the front end of middle segment 100 by a short arcuate connector segment or bend 104 of flange 96. Middle segment 100 may extend upward and rearward at a slight angle from its front end and bend 104 to its rear end and bend 106. Rear segment 102 may extend rearward from its front end and bend 106 to its rear end, to adjacent the rear end of flange 96 and to adjacent rear end 32.

Flange 90 may have an upwardly facing top surface 91 and a downwardly facing bottom surface 93 each of which may be essentially horizontal. Flange 90 may have an outer edge 92 and an inner edge 94 defining therebetween a width of flange 90. Outer edge 92 and inner edge 94 of left rear rail 86 are respectively left and right edges, whereas outer edge 92 and inner edge 94 of right rear rail 88 are respectively right and left edges.

Rear section 44 may have an outer width 120 defined between the left side of rear left rail 86 and the right side of rear right rail 88. Outer or left edge 92 of left rear rail 86 and outer or right edge 92 of right rail 88 may define therebetween outer width 120. Inner or right edge 94 of left rail 86 and inner or left edge 94 of right rail 88 may define therebetween an inner width 122 of rear section 44. Outer width 120 of rear section 44 may be smaller than or less than inner width 66 of front section 42. Thus, the front portions and ends 116 of rails 86 and 88 may extend within a space 115 between the rear portion of front left and right rails 48 and 50, said space having a width the same as inner width 66. Front ends 116 of rear rails 86 and 88 may be forward of the rear ends of front rails 48 and 50. Forward edges or ends 116 may extend downwardly from the top of the given rail to the bottom of the given rail. Edge 116 may include an upper edge segment 116A which may be essentially vertical and a lower edge segment 116B which angles downward and rearward from the lower end of upper segment 116A to the bottom of the given rail.

Left rear rail 86 may be laterally offset to the right of left front rail 48. The front portion/end of left rear rail 86 may be adjacent and laterally spaced or offset to the right of the rear portion/end of left front rail 48. The left side (for example, the left edges of flanges 90 and 96) of the front portion of left rear rail 86 may be adjacent and spaced or offset to the right of the right side (for example, the right edges of flanges 52 and 68) of the rear portion of left front rail 48. Similarly, right rear rail 88 may be laterally offset to the left of right front rail 50. The front portion/end of right rear rail 88 may be adjacent and laterally spaced or offset to the left of the rear portion/end of right front rail 50. The right side (for example, the right edges of flanges 90 and 96) of the front portion of right rear rail 88 may be adjacent and spaced or offset to the left of the left side (for example, the left edges of flanges 52 and 68) of the rear portion of right front rail 50. Left and right front rails may define therebetween a table-receiving space 117 which is directly above space 115 and is higher than the tops of rear rails 86 and 88/top surfaces 91 of upper flanges 90.

Left and right connector plates 132 may be provided to help secure the front rails to the rear rails. Left and right plates 132 may be essentially mirror images of one another. Connector plates 132 may be entirely lower than flange 52 forward segments 54 of rails 48 and 50. Left connector plate 132 may extend between and be secured to a front portion and/or end of upper flange 90 of left rear rail 86 and a front upper portion of flange segment 56 of upper flange 52 of left front rail 48. Similarly, right connector plate 132 may extend between and be secured to a front portion and/or end of upper flange 90 of right rear rail 88 and a front upper portion of flange segment 56 of upper flange 52 of right front rail 50. The front ends or edges of plates 132 may be adjacent, rearward of and lower than the bend segment 58 of the respective flange 52.

Each plate 132 may be V-shaped as viewed from the side. Connector plate 132 may include a front or forward panel or leg 134 and a rear panel or leg 136. Leg 136 adjacent a front end thereof may be secured to leg 134 adjacent a rear end thereof at an essentially horizontal laterally elongated intersection or bend 138 to define the V-shape. Bend 138 may extend perpendicular to the longitudinal direction of trailer frame 20 and of rails 48, 50, 86 and 88. Front leg 134 may have an upwardly and rearwardly facing top surface 135 and a downwardly and forwardly facing bottom surface 137. Rear leg 136 may have an upwardly facing top surface 139 and a downwardly facing bottom surface 141 each of which may be essentially horizontal. Upper or top surfaces 135 and 139 of legs 134 and 136 may define therebetween an obtuse angle D which may likewise be defined between lower surfaces 137 and 141. Angle D may be defined between any of (1) upper rear surface 135, (2) lower forward surface 137, (3) upper rear surface 55 of rear flange segment 56, and (4) lower forward surface 57 of segment 56 (all four of which may be essentially parallel to one another) and any one of (1) top surface 139, (2) bottom surface 141 of leg 136, (3) upper surface 91 of upper flange 90, and (4) lower surface 93 of flange 90 (all four of which may be parallel to one another).

Left connector plate 132 may have an inner or right edge having a front right edge segment or portion 146 and a rear right edge segment or portion 140 which may extend at an obtuse angle relative to segment 146 as viewed from above. Right edge segment 146 may extend rearward, downward and rightward from adjacent a front end of segment 146 to adjacent a rear end of segment 146 and adjacent a front end of rear segment 140. Left connector plate 132 may have an outer or left edge having a front left edge segment or portion 142 and a rear left edge segment or portion 144 which may extend at an obtuse angle relative to portion 142 as viewed from above. Left front edge segment 142 may extend or angle rearward and downward from adjacent a front end thereof to adjacent a rear end thereof and to adjacent a front end of rear left segment 144. Right rear edge segment 140 may be essentially parallel to, closely adjacent and directly above a front portion of right edge 94 of the left upper flange 90. Front left edge segment 142 may extend downward and rearward from adjacent a front end thereof to adjacent a rear end thereof and to adjacent a front end of rear left edge segment 144. Front left edge segment 142 may be essentially parallel to, closely adjacent and extend directly above a front upper portion of left edge 60 of left rear flange segment 56. Rear left edge segment 144 may extend rearward and rightward from adjacent a rear end of front left edge segment 142 and a front end of left segment 144 to adjacent a rear end of left segment 144 and the left edge 92 of left upper flange 90.

Similarly, right connector plate 132 may have an inner or left edge having a front left edge segment or portion 146 and a rear left edge segment or portion 140 which may extend at an obtuse angle relative to segment 146 as viewed from above. Left edge segment 146 may extend rearward, downward and leftward from adjacent a front end of left edge segment 146 to adjacent a rear end of segment 146 and adjacent a front end of rear left segment 140. Right connector plate 132 may have an outer or right edge having a front right edge segment or portion 142 and a rear right edge segment or portion 144 which may extend at an obtuse angle relative to portion 142 as viewed from above. Right front edge segment 142 may extend or angle rearward and downward from adjacent a front end thereof to adjacent a rear end thereof and to adjacent a front end of rear right segment 144. Left rear edge segment 140 may be essentially parallel to, closely adjacent and directly above a front portion of left edge 94 of the right upper flange 90. Front right edge segment 142 may extend downward and rearward from adjacent a front end thereof to adjacent a rear end thereof and to adjacent a front end of rear right edge segment 144. Front right edge segment 142 may be essentially parallel to, closely adjacent and extend directly above a front upper portion of right edge 60 of right rear flange segment 56. Rear right edge segment 144 may extend rearward and leftward from adjacent a rear end of front right edge segment 142 and a front end of right segment 144 to adjacent a rear end of right segment 144 and the right edge 92 of right upper flange 90.

Front leg 134 of left connector 132 may be secured to left rear flange segment 56 such that bottom or lower surface 137 of left front leg 134 may be essentially parallel to and closely adjacent or in contact with upper surface 55 of left rear flange segment 56. Rear leg 136 of left connector 132 may be secured to left rear upper flange 90 such that bottom or lower surface 141 of left rear leg 136 may be essentially parallel to and closely adjacent or in contact with upper surface 91 of left rear upper flange 90.

Similarly, front leg 134 of right connector 132 may be secured to right rear flange segment 56 such that bottom or lower surface 137 of right front leg 134 may be essentially parallel to and closely adjacent or in contact with upper surface 55 of right rear flange segment 56. Rear leg 136 of right connector 132 may be secured to right rear upper flange 90 such that bottom or lower surface 141 of right rear leg 136 may be essentially parallel to and closely adjacent or in contact with upper surface 91 of right rear upper flange 90.

Figure 2A:
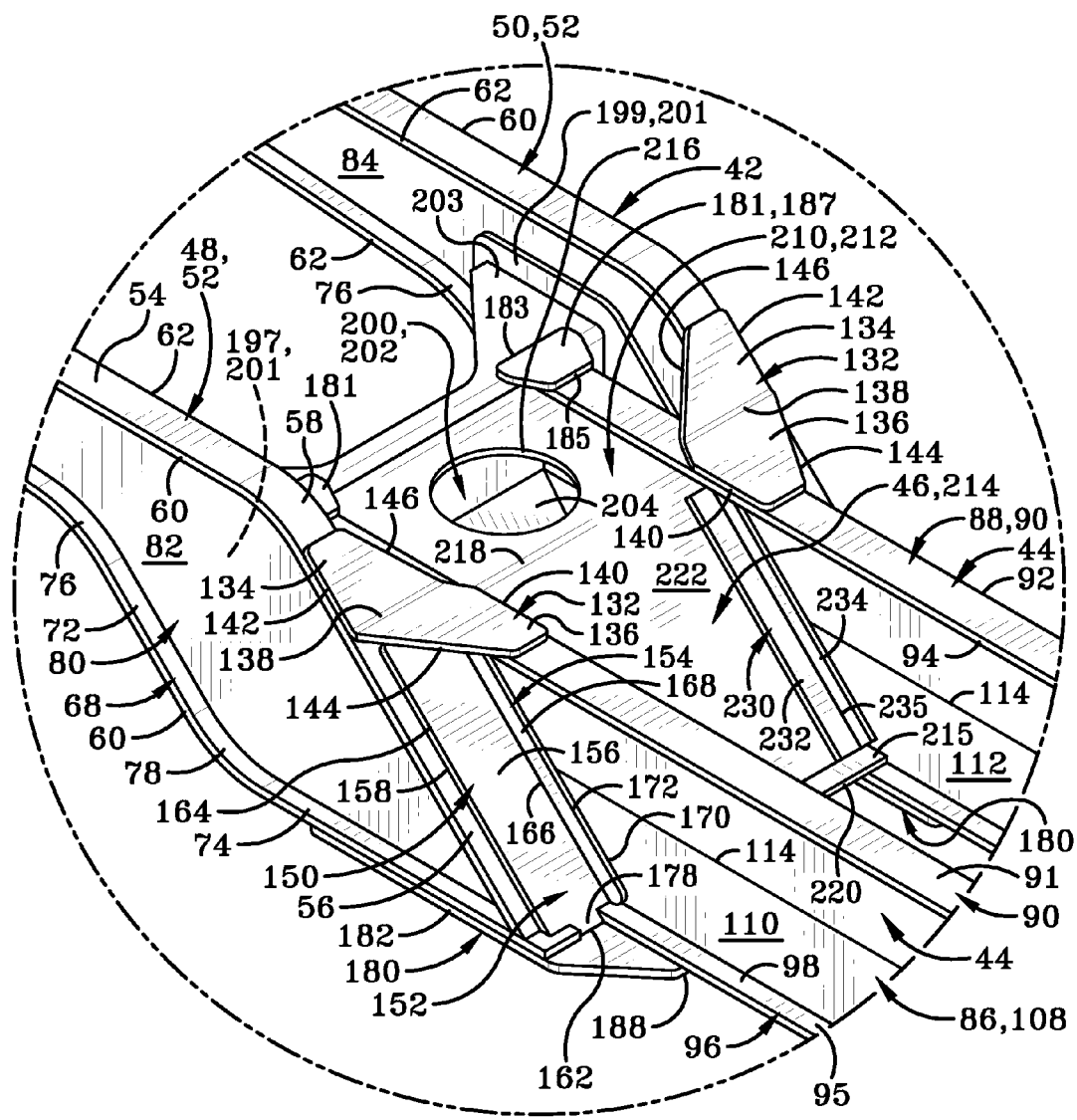
FIG. 2A is an enlarged perspective view of the encircled portion of FIG. 2 showing the stepped out neck region.
Figure 5:
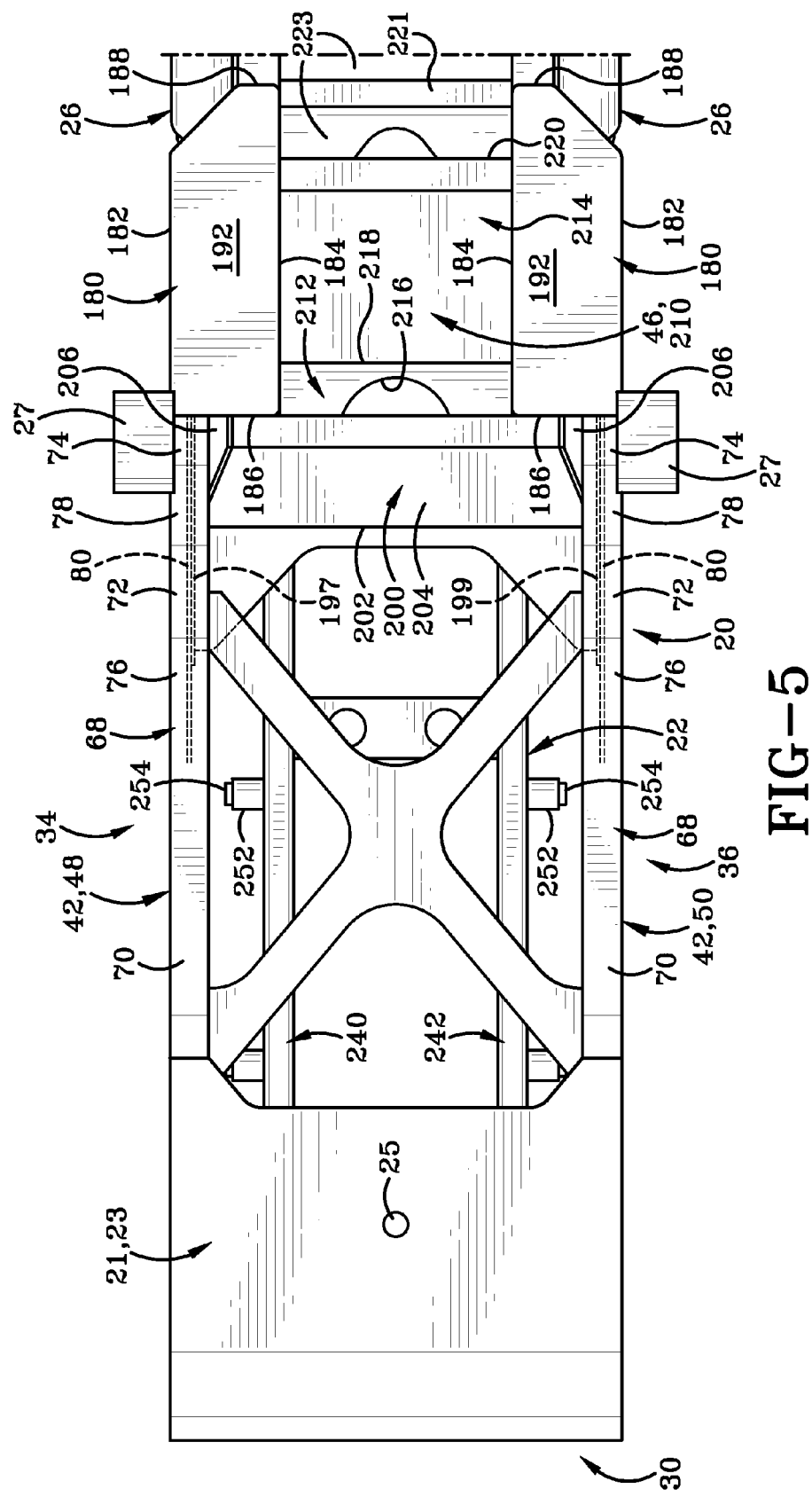
FIG. 5 is an enlarged bottom view of the front section of the trailer frame.
Figure 6:
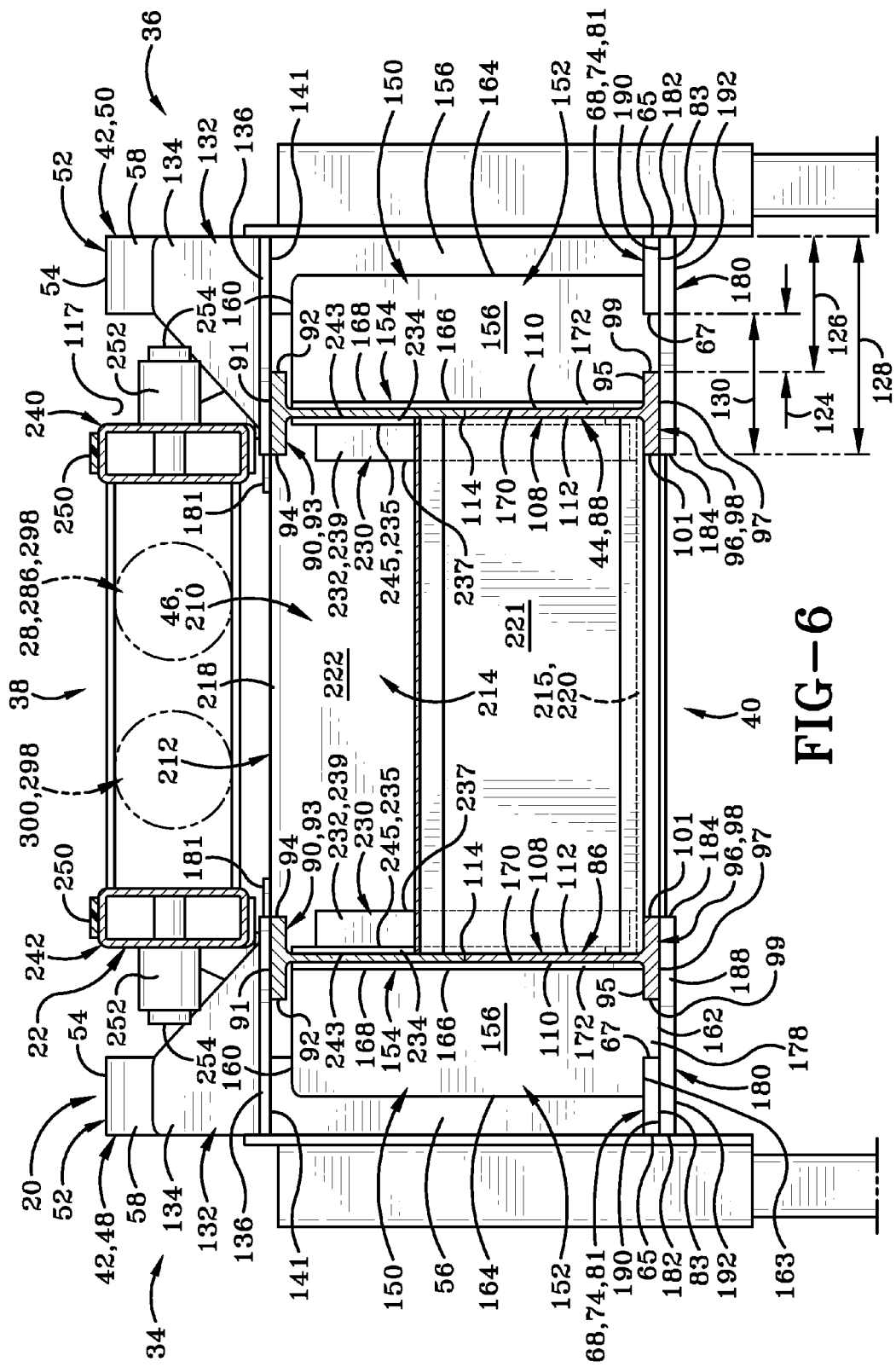
FIG. 6 is a cross-sectional view taken along line 6-6 in FIG. 4.

With primary reference to FIGS. 2A, 5 and 6, neck section 46 may include left and right bottom connector plates 180. Left and right plates 180 may be essentially identical or essentially mirror images of one another. Each connector plate 180 may have an outer edge 182 and an inner edge 184 which may be longitudinally elongated and essentially parallel to the outer edge 182. Outer and inner edges 182 and 184 of left plate 180 are respectively left and right edges, whereas outer and inner edges 182 and 184 of right plate 180 are respectively right and left edges. Each plate 180 may have front and rear edges 186 and 188 which may be laterally elongated and extend from outer edge 182 to inner edge 184. Each plate 180 may be longitudinally elongated and may be essentially flat, essentially horizontal and have essentially flat horizontal top and bottom surfaces 190 and 192.

Left plate 180 extends between and is secured to left front rail 48 and left rear rail 86 adjacent the rear end of left front rail 48 and adjacent the front end of left rear rail 86. Left plate 180 may extend between and be secured to rear segment 74 of lower flange 68 of left front rail 48 and front segment 98 of lower flange 96 of left rear rail 86. Left plate 180 may extend directly below said rear segment 74 and said segment 98 of flange 96 whereby top surface 190 of left plate 180 may be closely adjacent or in contact with bottom surface 83 of said rear segment 74 and bottom surface 97 of said segment 98 of said flange 96. Left edge 182 of left plate 180 may be directly below left edge 60 of upper flange 52 rear segment 56 of left front rail 48 and closely adjacent and directly below left edge 65 of lower flange 68 rear segment 74 of left front rail 48. Right edge 184 of left plate 180 may be directly below right edge 94 of upper flange 90 of left rear rail 86 and closely adjacent and directly below right edge 101 of lower flange 96 of left rear rail 86. Left connector plate 180 may be, for example, welded or bolted to segment 74 of left S-shaped flange 68. Left upper connector plate 132 may extend directly above or be entirely directly above left lower connector plate 180.

Similarly, right plate 180 extends between and is secured to right front rail 50 and right rear rail 88 adjacent the rear end of right front rail 50 and adjacent the front end of right rear rail 88. Right plate 180 may extend between and be secured to rear segment 74 of lower flange 68 of right front rail 50 and front segment 98 of lower flange 96 of right rear rail 88. Right plate 180 may extend directly below said rear segment 74 and said segment 98 of flange 96 whereby top surface 190 of right plate 180 may be closely adjacent or in contact with bottom surface 83 of said rear segment 74 and bottom surface 97 of said segment 98 of said flange 96. Right edge 182 of right plate 180 may be directly below right edge 60 of upper flange 52 rear segment 56 of right front rail 50 and closely adjacent and directly below right edge 65 of lower flange 68 rear segment 74 of right front rail 50. Left edge 184 of right plate 180 may be directly below left edge 94 of upper flange 90 of right rear rail 88 and closely adjacent and directly below left edge 101 of lower flange 96 of right rear rail 88. Right connector plate 180 may be, for example, welded or bolted to segment 74 of right S-shaped flange 68. Right upper connector plate 132 may extend directly above or be entirely directly above right lower connector plate 180.

As shown in FIG. 6, each connector plate 180 may bridge or extend across a gap 124 defined between the respective inner edge 67 and outer edge 99 and may have a width 128 (defined between edges 182 and 184) which may be essentially the same as the width defined between the outer edge 65 and inner edge 101 of the corresponding front and rear rails.

Neck section 46 may extend between and be secured to left and right front rails 48 and 50, and may extend between and be secured to left and right rear rails 86 and 88, whereby front and rear sections 42 are mounted on one another via neck section 46. With primary reference to FIGS. 7 and 8, neck section 46 may include left and right lateral neck section plates 197 and 199 which may be essentially mirror images of one another. Plates 197 and 199 may have an essentially vertical upper plate segment 201 and an angled lower plate segment 206 which may be secured to the bottom of upper segment 201 at an essentially horizontal longitudinally elongated intersection or bend 195 and angles inwardly and downwardly therefrom to a terminal end which may be generally the same height as connector plates 180 and a little lower than lower flange segments 98 or flanges 96 and rear segments 74 of flanges 68. Bend 195 and may be essentially perpendicular to intersection or bend 138. Plate segments 201 and 206 may also be referred to as plates.

Left upper plate segment 201 of left lateral plate 197 may be secured to inner or right surface 84 of left web 80 of left front rail 48 and left lower plate segment 206 may extend or angle downwardly and to the right away from left web 80 and to the right of rear flange segment 74 of rail 48. The left surface of left plate segment 201 may be essentially vertical and be closely adjacent or in contact with right surface 84 of left web 80. Similarly, right upper plate segment 201 of right lateral plate 199 may be secured to inner or left surface 84 of right web 80 of right front rail 50 and right lower plate segment 206 may extend or angle downwardly and to the left away from right web 80 and to the left of rear flange segment 74 of rail 50. The right surface of left plate segment 201 may be essentially vertical and be closely adjacent or in contact with left surface 84 of right web 80. Plate segments 201 and the left and right surfaces thereof may be essentially parallel to webs 80 and the left and right surfaces 82 and 84 thereof.

Figure 7:
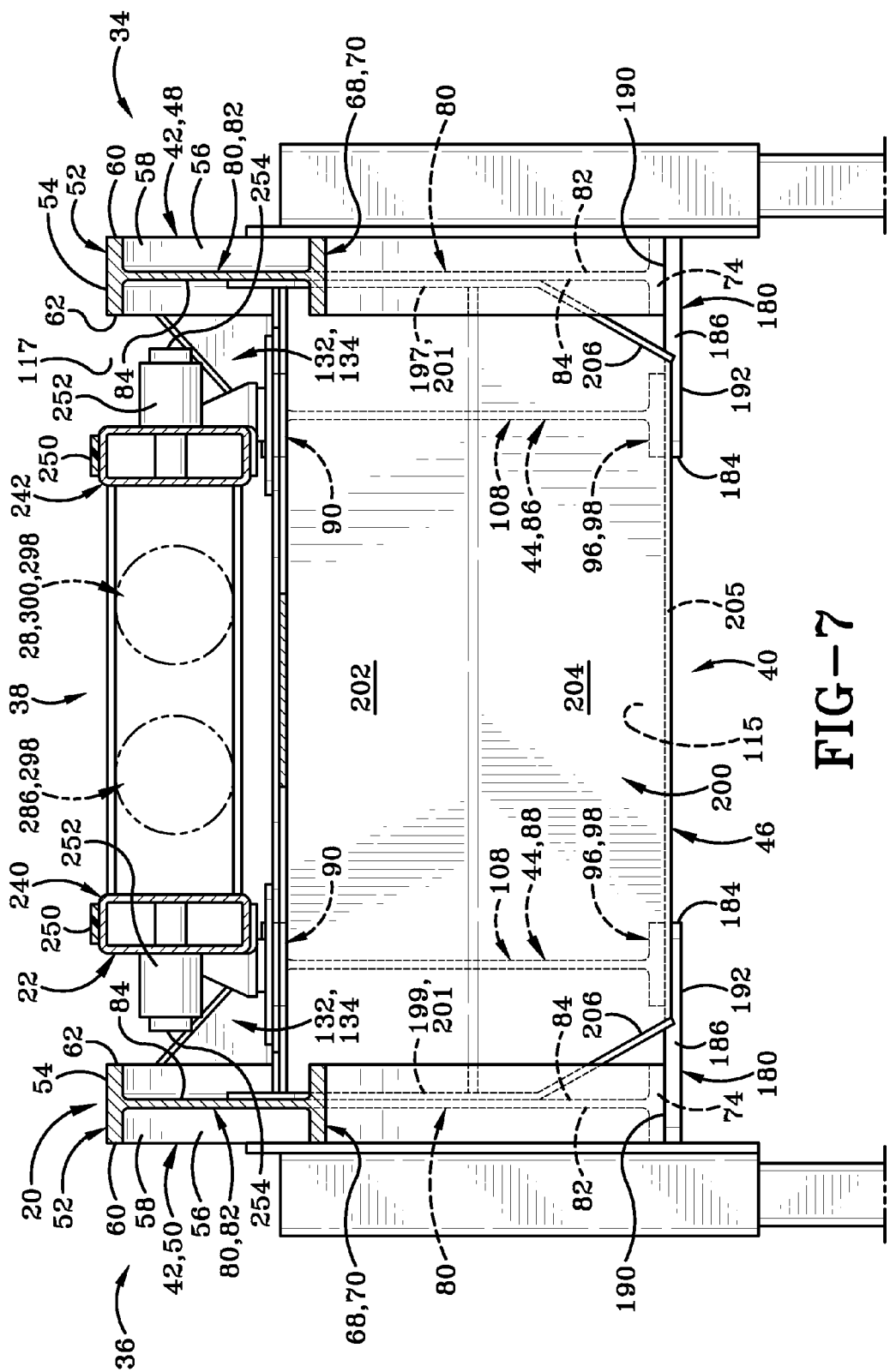
FIG. 7 is a cross-sectional view taken along line 7-7 in FIG. 4.

With continued reference to FIGS. 7 and 8, neck section 46 may also include a front or forward neck section plate 200 which may extend from adjacent inner surface 84 of left web 80 to inner surface 84 of right web 80. Plate 200 may extend between and be secured to left and right lateral plates 197 and 199, with portions of plate 200 being secured to upper segments 201 and lower segments 206. Plate 200 may include several plate segments, such as a front plate segment 203, a forward intermediate plate segment 202, a rearward intermediate plate segment 204, and a rear plate segment 205. Neck section plate segments 203, 204 and 205 may also be referred to as plates.

Plate segment 202 adjacent an upper end thereof may be secured to plate segment 203 adjacent a rear end thereof at an essentially horizontal laterally elongated intersection or bend 207 and extend downward therefrom to a lower end of plate 202. Angled plate segment 204 adjacent an upper forward end thereof may be secured to plate segment 202 adjacent the lower or bottom end thereof at an essentially horizontal laterally elongated intersection or bend 209 and extend or angle downward and rearward therefrom to a rear end of plate 204. Plate segment 205 adjacent a forward or front end thereof may be secured to plate segment 204 adjacent the lower rear end thereof at an essentially horizontal laterally elongated intersection or bend 209 and extend rearward therefrom to a rear terminal edge which may be adjacent or in contact with front edges 186 of connector plates 180. Intersections or bends 207, 209 and 211 may be essentially parallel to one another and bend 138 and may be essentially perpendicular to intersection or bend 195. Each of plate segments 203, 202, 204 and 205 may be essentially flat. Plate segments 203 and 205 may be essentially horizontal and plate segment 202 may be essentially vertical.

The left edge of plate 200 may be secured to and closely adjacent or in contact with the right surface of left lateral plate 197, and the right edge of plate 200 may be secured to and closely adjacent or in contact with the left surface of right lateral plate 199. The left edges of plate segments 203 and 202 may be secured to and closely adjacent or in contact with the right surface of left lateral plate segment 201 of left plate 197, and the right edges of plate segments 203 and 202 may be secured to and closely adjacent or in contact with the left surface of right lateral plate segment 201 of right plate 199. The left edge of plate segment 204 may be secured to and closely adjacent or in contact with the right surface of left lateral plate segments 201 and 206 of left plate 197, and the right edge of plate segment 204 may be secured to and closely adjacent or in contact with the left surface of right lateral plate segments 201 and 206 of right plate 199. The left edge of plate segment 205 may be secured to and closely adjacent or in contact with the right surface of left lateral plate segment 206 of left plate 197, and the right edge of plate segment 205 may be secured to and closely adjacent or in contact with the left surface of right lateral plate segment 206 of right plate 199.

Front ends or edges 116 of left and right rear rails 86 and 88 may be secured to and closely adjacent or in contact with the rear surface of forward plate 200. Upper edge segments 116A may be secured to and closely adjacent or in contact with the rear surface of plate segment 202, and lower edge segments 116B may be secured to and closely adjacent or in contact with the rear or upper surface of plate segment 204. The rear surface of plate segment 204 may be essentially parallel to forward edge segment 116B. The front ends of lower flange segments 98 of flanges 96 of rails 86 and 88 may be secured to and closely adjacent or in contact with the rear/upper surface of plate segment 204 adjacent the lower/rear end of segment 204 and adjacent bend 211. The bottom surfaces 83 of lower flange segments 98 of flanges 96 of rails 86 and 88 adjacent the front ends of segments 98 and front ends 116 may be secured to and closely adjacent or in contact with the top surface of plate segment 205.

With primary reference to FIGS. 2, 2A, 4 and 8, left and right forward connector plates 181 may be provided adjacent the front ends of left and right rear rails 86 and 88 to help secure rear section 44 to neck section 46. Forward plates 181 may be essentially flat and horizontal and may have front and rear edges 183 and 185, an upwardly facing top surface 187 and a downwardly facing bottom surface 189 which may be parallel to top surface 187. Surfaces 187 and 189 may be essentially horizontal and parallel to the top surfaces 91 of upper flanges 90 and the top surface of plate segment 203.

Left connector plate 181 may extend between and be secured to the front portion of left rear rail 86 and a left rear portion of plate segment 203 adjacent bend 207. Left plate 181 may extend forward beyond the front end of left upper flange 90 and may extend directly above left upper flange and plate segment 203. Bottom surface 189 of left plate 181 may be secured to and closely adjacent or in contact with the top surface of plate 203 and top surface 91 of left upper flange 90. Front edge 183 of left plate 181 may be adjacent and forward of bend 207 and plate segment 202, whereas rear edge 185 may be adjacent and rearward of bend 203 and plate segment 202. The front end of left upper flange 190 may be closely adjacent or in contact with bend 207, the rear end/edge of plate segment 203 and the rear surface of plate segment 202.

Similarly, right connector plate 181 may extend between and be secured to the front portion of right rear rail 88 and a right rear portion of plate segment 203 adjacent bend 207. Right plate 181 may extend forward beyond the front end of right upper flange 90 and may extend directly above right upper flange and plate segment 203. Bottom surface 189 of right plate 181 may be secured to and closely adjacent or in contact with the top surface of plate 203 and top surface 91 of right upper flange 90. Front edge 183 of right plate 181 may be adjacent and forward of bend 207 and plate segment 202, whereas rear edge 185 may be adjacent and rearward of bend 203 and plate segment 202. The front end of right upper flange 190 may be closely adjacent or in contact with bend 207, the rear end/edge of plate segment 203 and the rear surface of plate segment 202.

With primary reference to FIGS. 6 and 8, neck section 46 may also include a rear or rearward neck section plate 210 which may extend from adjacent inner surface 112 of left web 108 to inner surface 112 of right web 108. Plate 210 may include several plate segments, such as a front plate segment 212, an intermediate plate segment 214 and a rear plate segment 215. Plate segment 212 may have a front end 217 which may be closely adjacent or in contact with plate segment 202 adjacent bend 207 so that plate segment 212 may extend rearward from front end 217 and from adjacent plate segment 202. An aperture 216 may be formed in plate segment 212, may be essentially circular and may be generally centered between the left and right edges and between the front and rear edges of segment 212. Neck section plate segments 212, 214 and 215 may also be referred to as plates.

Angled plate segment 214 adjacent an upper forward end thereof may be secured to plate segment 212 adjacent a rear end thereof at an essentially horizontal laterally elongated intersection or bend 218 and extend or angle downward and rearward therefrom to a rear end of plate 214. Plate segment 215 adjacent a forward or front end thereof may be secured to plate segment 214 adjacent the lower rear end thereof at an essentially horizontal laterally elongated intersection or bend 219 and extend rearward therefrom to an essentially horizontal laterally elongated rear terminal edge 220 which may extend directly above connector plates 180 and flange segments 98 of rear lower flanges 96. Intersections or bends 218 and 219 may be essentially parallel to one another and bends 138, 207, 209 and 211 and may be essentially perpendicular to intersection or bend 195. Each of plate segments 212, 214 and 215 may be essentially flat. Plate segments 212 and 215 may be essentially horizontal. Plate segment 214 may have an upwardly and rearwardly facing upper surface 222 and a downwardly and forwardly facing lower surface which may be essentially parallel to surface 222, with these upper and lower surfaces extending from the front upper end or edge of segment 214 to the rear lower end of segment 214 and from the left edge to the right edge of segment 214. Rear upper surface 222 of plate segment 214 and rear upper surfaces 55 of rear flange segments 56 of flanges 52 may be essentially parallel and essentially coplanar.

The left edge of plate 210, including the left edges of plate segments 212, 214 and 215, may be secured to and closely adjacent or in contact with the right surface 112 of left web 108 of left rear rail 86. The right edge of plate 210, including right edges of plate segments 212, 214 and 215, may be secured to and closely adjacent or in contact with the left surface 112 of right web 108 of right rear rail 88. The left edge of plate 210, including the left edges of plate segments 212, 214 and 215, may extend directly between or be entirely directly between the upper and lower flanges 90 and 96 of left rear rail 86, extend or be entirely directly below upper flange 90 of left rear rail 86, and extend or be entirely directly above lower flange 96 of left rear rail 86. The right edge of plate 210, including the right edges of plate segments 212, 214 and 215, may extend directly between or be entirely directly between the upper and lower flanges 90 and 96 of right rear rail 88, extend or be entirely directly below upper flange 90 of right rear rail 88, and extend or be entirely directly above lower flange 96 of right rear rail 88.

Upper surface of plate segment 212 along the left and right edges thereof may be directly below, secured to and closely adjacent or in contact respectively with lower surfaces 93 of upper flanges 90 of left and right rear rails 86 and 88 adjacent the front ends of flanges 90 and rails 86 and 88. The downwardly facing bottom surface of plate segment 215 along the left and right edges thereof may be respectively secured to and closely adjacent or in contact with upper surfaces 95 of lower flanges 96 of left and right rear rails 86 and 88 adjacent the front ends of flanges 96. The bottom surface of plate segment 215 may be essentially horizontal and parallel to upper surfaces 95 of lower flanges 96 adjacent the front ends of flanges 96.

There may be additional rigid cross structures which extend between and are secured to rear left and right rails 86 and 88 rearward of rear plate 210 and forward of rear cross structure 85, some of which may not be shown in the Figures. For example, a cross beam 221 (FIGS. 5, 6) may extend between and be secured to rear left and right rails 86 and 88 rearward of and adjacent rear end 220 of plate 210. Likewise a generally horizontal plate 223 (FIGS. 5, 6) may extend between and be secured to rear left and right rails 86 and 88 rearward of plate 210. A front edge of plate 223 may be secured to and closely adjacent or in contact with the rear surface of plate segment 214. It is noted that cross beam 221 and plate 223 are not shown in FIGS. 2 and 2A to allow for clarity of other structure of and around neck section 46.

As shown in FIG. 8, the lower surfaces of plate segments 212 and portion 214 may define therebetween an obtuse angle E which may be in the same range as the range noted above with respect to each of angles A, B and C. Angle E may be essentially equal to angle D of plate 132. Upper rear surface 222 of plate segment 214 and top surface 95 of lower flange 96 adjacent the front end thereof may define therebetween an angle F which may be in the same range as the range noted above with respect to each of angles A, B, C and D. Angle F may be essentially equal to each of angle D and angle E.

With primary reference to FIGS. 2A, 3 and 6, left and right outer brackets 150 may be provided to help secure front section 42 to rear section 46, such as by helping secure front rails 48 and 50 respectively to rear rails 86 and 88. Left and right brackets 150 may be essentially mirror images of one another. Each bracket 150 may be an L-shaped bracket such that it has an L-shaped cross sectional shape. Each of left and right brackets 150 may have a top front end 160 and a bottom or lower rear end 162 such that each bracket 150 extends or angles downward and rearward from front end 160 to rear end 162.

Left outer bracket 150 may include a left panel or leg 152 and a right panel or leg 154 each of which may extend from adjacent end 160 to end 162. Right leg 154 along a forward lower edge thereof may be secured to right leg 232 along a right edge thereof at an elongated intersection or bend 166 and extend rearward and upward therefrom such that legs 152 and 154 may be perpendicular to one another and such that legs 152 and 154 may provide the L-shaped cross section of left bracket 150. Bend 166 may be elongated from adjacent end 160 to adjacent end 162 so that bend 166 extends or angles downward and rearward from adjacent end 160 to adjacent end 162. Right leg 232 may have an outer or left edge 164 and an inner or right edge along bend 166. Right leg 232 may have an upward and rearward facing upper surface 156 and a downward and forward facing forward surface 158 which may be essentially parallel to surface 156. Right leg 232 may have a bottom end or edge 163 so that leg 152 extends from top end 160 to bottom end 163. Right leg 154 may have a leftward facing left surface 168 and a rightward facing right surface 170. Right leg 154 may have an upper edge 172 which extends or angles downward and rearward from adjacent front upper end 160 to adjacent lower rear end 162. A left bottom tongue 178, which is narrower than right leg 232 as viewed from above or from the rear, may extend downward and rearward from bottom end 163 of right leg 232.

Left bracket 150 may extend between and be secured to left front rail 48 adjacent the rear end thereof and left rear rail 86 adjacent the front end thereof. More particularly, left bracket 150 may extend between and be secured to rear flange segment 56 of left front rail 48 and web 108 of left rear rail 86. Right leg 232 may, for example, be welded to rear segment 56 or be secured thereto by bolts. Right surface 170 of right leg 154 may be secured to and closely adjacent or in contact with web 108 left surface 110. Right leg 154 may extend directly between or be entirely directly between upper and lower flanges 90 and 96 of left rear rail 86. Right leg 154 may extend directly below or be entirely directly below upper flange 90 of left rear rail 86. Right leg 154 may extend directly above or be entirely directly above lower flange 96 of left rear rail 86. Upper edge 172 of right leg 154 may be essentially parallel to rear flange segments 56 and the upper and lower surfaces 55 and 57 thereof, plate segment 214 and surface 222 thereof, surfaces 156 and 158 of right leg 232, and connector plate 132 panels 136 and surfaces 139 and 141 thereof. Top edge 160 may extend directly below and adjacent bottom surface 141 of panel 136 of left connector plate 132 and bottom surface 93 of left upper flange 90 to the left of web 108 of left rear rail 86.

Bottom end 163 of left leg 152 may be closely adjacent or in contact with upper surface 81 of segment 74 of flange 68 of left front rail 48 adjacent the rear end of segment 74 and closely adjacent or in contact with upper surface 95 of flange segment 98 of lower flange 96 of left rear rail 86. Lower end 163 may be closely adjacent, rearward of and at essentially the same height as the bottom rear end of segment 56 of left flange 68. Lower end 163 may be adjacent the rear end of front frame section 42 along the left side thereof. Lower end 163 may be adjacent and spaced upwardly of top surface 190 of left lower connector plate 180. Left bottom tongue 178 may extend directly between the right edge of left rear flange segment 74 adjacent the rear end of segment 74 and the left edge of left forward flange segment 98. The left edge of left tongue 178 may be secured to and closely adjacent or in contact with the right edge of left rear flange segment 74. The right edge of left tongue 178 may be secured to and closely adjacent or in contact with the left edge of left rear flange segment 74. The bottom 162 of left tongue 178 may be secured to and closely adjacent or in contact with upper surface 190 of left connector plate 180.

Similarly, right outer bracket 150 may include a right panel or leg 152 and a left panel or leg 154 each of which may extend from adjacent end 160 to end 162. Left leg 154 along a forward lower edge thereof may be secured to right leg 152 along a right edge thereof at an elongated intersection or bend 166 and extend rearward and upward therefrom such that legs 152 and 154 may be perpendicular to one another and such that legs 152 and 154 may provide the L-shaped cross section of right bracket 150. Bend 166 may be elongated from adjacent end 160 to adjacent end 162 so that bend 166 extends or angles downward and rearward from adjacent end 160 to adjacent end 162. Right leg 152 may have an outer or right edge 164 and an inner or left edge along bend 166. Right leg 152 may have an upward and rearward facing upper surface 156 and a downward and forward facing forward surface 158 which may be essentially parallel to surface 156. Right leg 152 may have a bottom end or edge 163 so that leg 152 extends from top end 160 to bottom end 163. Left leg 154 may have a rightward facing right surface 168 and a leftward facing left surface 170. Left leg 154 may have an upper edge 172 which extends or angles downward and rearward from adjacent front upper end 160 to adjacent lower rear end 162. A right bottom tongue 178, which is narrower than right leg 152 as viewed from above or from the rear, may extend downward and rearward from bottom end 163 of right leg 152.

Right bracket 150 may extend between and be secured to right front rail 50 adjacent the rear end thereof and right rear rail 88 adjacent the front end thereof. More particularly, right bracket 150 may extend between and be secured to rear flange segment 56 of right front rail 50 and web 108 of right rear rail 88. Right leg 152 may, for example, be welded to rear segment 56 or be secured thereto by bolts. Left surface 170 of left leg 154 may be secured to and closely adjacent or in contact with web 108 right surface 110. Left leg 154 may extend directly between or be entirely directly between upper and lower flanges 90 and 96 of right rear rail 88. Left leg 154 may extend directly below or be entirely directly below upper flange 90 of right rear rail 88. Left leg 154 may extend directly above or be entirely directly above lower flange 96 of right rear rail 88. Upper edge 172 of left leg 154 may be essentially parallel to flange segments 54 and the upper and lower surfaces thereof, plate segment 214 and surface 222 thereof, surfaces 156 and 158 of right leg 152, and connector plate 132 panels 136 and surfaces 139 and 141 thereof. Top edge 160 may extend directly below and adjacent bottom surface 141 of panel 136 of right connector plate 132 and bottom surface 93 of right upper flange 90 to the right of web 108 of right rear rail 88.

Bottom end 163 of right leg 152 may be closely adjacent or in contact with upper surface 81 of segment 74 of flange 68 of right front rail 50 adjacent the rear end of segment 74 and closely adjacent or in contact with upper surface 95 of flange segment 98 of lower flange 96 of right rear rail 88. Lower end 163 may be closely adjacent, rearward of and at essentially the same height as the bottom rear end of segment 56 of right flange 68. Lower end 163 may be adjacent the rear end of front frame section 42 along the right side thereof. Lower end 163 may be adjacent and spaced upwardly of top surface 190 of right lower connector plate 180. Right bottom tongue 178 may extend directly between the left edge of right rear flange segment 74 adjacent the rear end of segment 74 and the right edge of right forward flange segment 98. The right edge of right tongue 178 may be secured to and closely adjacent or in contact with the left edge of right rear flange segment 74. The left edge of right tongue 178 may be secured to and closely adjacent or in contact with the right edge of right rear flange segment 74. The bottom 162 of right tongue 178 may be secured to and closely adjacent or in contact with upper surface 190 of right connector plate 180.

With primary reference to FIGS. 2A, 6 and 8, left and right inner brackets 230 may be provided along a front portion of rear section 44 and left and right rear rails 86 and 88 to help secure rear section 44 to neck section 46 and front section 42. Brackets 230 may be essentially mirror images of one another and may be adjacent the rear end of front section 42 and the rear ends of front rails 48 and 50. Each bracket 230 may be an L-shaped bracket such that it has an L-shaped cross sectional shape. Each of left and right brackets 230 may have an upper front end 231 and a bottom or lower rear end 233 such that each bracket 230 extends or angles downward and rearward from front end 231 to rear end 233.

Left inner bracket 230 may include a right panel or leg 232 and a left panel or leg 234 each of which may extend from adjacent end 231 to end 233. Left leg 234 along a forward lower edge thereof may be secured to left leg 232 along a left edge thereof at an elongated intersection or bend 235 and extend rearward and upward therefrom such that legs 232 and 234 may be perpendicular to one another and such that legs 232 and 234 may provide the L-shaped cross section of left bracket 230. Bend 235 may be elongated from adjacent end 231 to adjacent end 233 so that bend 235 extends or angles downward and rearward from adjacent end 231 to adjacent end 233. Right leg 232 may have an inner or right edge 237 and an outer or left edge along bend 235. Right leg 232 may have an upward and rearward facing upper surface 239 and a downward and forward facing forward surface 241 which may be essentially parallel to surface 239. Left leg 234 may have a leftward facing left surface 243 and a rightward facing right surface 245 which may be essentially parallel to surface 243. Surfaces 243 and 245 may be essentially vertical. Left leg 234 may have an upper edge 247 which extends or angles downward and rearward from adjacent front upper end 231 to adjacent lower rear end 233. Left bracket 230 may extend between and be secured to left rear rail 86 generally adjacent the front end thereof and plate segment 214 along the left edge thereof. More particularly, left bracket 230 may extend between and be secured to right surface 112 of web 108 of left rear rail 86 and rear upper surface 222 of plate segment 214. Lower forward surface 241 of right leg 232 may be secured to and closely adjacent or in contact with upper rear surface 222 of plate segment 214. Left surface 243 of left leg 234 may be secured to and closely adjacent or in contact with web 108 right surface 112. Left leg 234 may extend directly between or be entirely directly between upper and lower flanges 90 and 96 of left rear rail 86 to the right of left web 108. Left leg 234 may extend directly below or be entirely directly below upper flange 90 of left rear rail 86. Left leg 234 may extend directly above or be entirely directly above lower flange 96 of left rear rail 86. Upper edge 247 of left leg 234 may be essentially parallel to rear flange segments 56 and the upper and lower surfaces 55 and 57 thereof, plate segment 214 and surface 222 thereof, surfaces 239 and 241 of right leg 232, and connector plate 132 panels 136 and surfaces 139 and 141 thereof. Top edge 231 may extend directly below and adjacent bottom surface 141 of panel 136 of left connector plate 132 and bottom surface 93 of left upper flange 90 to the right of web 108 of left rear rail 86. Lower rear end 233 may be closely adjacent or in contact with the top surface of plate segment 220 adjacent the left edge thereof, bend 219 adjacent the left end thereof or upper surface 222 of plate segment 214 adjacent the left edge thereof. Left bracket 230 may be essentially parallel to left bracket 150 and on opposite sides (respectively right and left sides) of left web 108 with left surface 243 of left leg 234 facing and directly opposite of right surface 170 of right leg 154 of left bracket 150 and with a portion of left web 108 directly between said left surface 243 and said right surface 170.

Similarly, right inner bracket 230 may include a left panel or leg 232 and a right panel or leg 234 each of which may extend from adjacent end 231 to end 233. Right leg 234 along a forward lower edge thereof may be secured to right leg 232 along a right edge thereof at an elongated intersection or bend 235 and extend rearward and upward therefrom such that legs 232 and 234 may be perpendicular to one another and such that legs 232 and 234 may provide the L-shaped cross section of left bracket 230. Bend 235 may be elongated from adjacent end 231 to adjacent end 233 so that bend 235 extends or angles downward and rearward from adjacent end 231 to adjacent end 233. Left leg 232 may have an inner or left edge 237 and an outer or right edge along bend 235. Left leg 232 may have an upward and rearward facing upper surface 239 and a downward and forward facing forward surface 241 which may be essentially parallel to surface 239. Right leg 234 may have a rightward facing right surface 243 and a leftward facing left surface 245 which may be essentially parallel to surface 243. Surfaces 243 and 245 may be essentially vertical. Right leg 234 may have an upper edge 247 which extends or angles downward and rearward from adjacent front upper end 231 to adjacent lower rear end 233. Right bracket 230 may extend between and be secured to right rear rail 88 generally adjacent the front end thereof and plate segment 214 along the right edge thereof. More particularly, right bracket 230 may extend between and be secured to left surface 112 of web 108 of right rear rail 88 and rear upper surface 222 of plate segment 214. Lower forward surface 241 of left leg 232 may be secured to and closely adjacent or in contact with upper rear surface 222 of plate segment 214. Right surface 243 of right leg 234 may be secured to and closely adjacent or in contact with web 108 left surface 112. Right leg 234 may extend directly between or be entirely directly between upper and lower flanges 90 and 96 of right rear rail 88 to the left of right web 108. Right leg 234 may extend directly below or be entirely directly below upper flange 90 of right rear rail 88. Right leg 234 may extend directly above or be entirely directly above lower flange 96 of right rear rail 88. Upper edge 247 of right leg 234 may be essentially parallel to rear flange segments 56 and the upper and lower surfaces 55 and 57 thereof, plate segment 214 and surface 222 thereof, surfaces 239 and 241 of left leg 232, and connector plate 132 panels 136 and surfaces 139 and 141 thereof. Top edge 231 may extend directly below and adjacent bottom surface 141 of panel 136 of right connector plate 132 and bottom surface 93 of right upper flange 90 to the left of web 108 of right rear rail 88. Lower rear end 233 may be closely adjacent or in contact with the top surface of plate segment 220 adjacent the right edge thereof, bend 219 adjacent the right end thereof or upper surface 222 of plate segment 214 adjacent the right edge thereof. Right bracket 230 may be essentially parallel to right bracket 150 and on opposite sides (respectively left and right sides) of right web 108 with right surface 243 of right leg 234 facing and directly opposite of left surface 170 of left leg 154 of right bracket 150 and with a portion of right web 108 directly between said right surface 243 and said left surface 170.

Angle F was discussed earlier with reference to FIG. 8. It is noted that angle F may be defined be a variety of surfaces. More particularly, as shown in FIG. 3 or 8, angle F may be defined between any of (1) surface 222, (2) the lower front surface of plate segment 214, (3) top surface 239 of inner leg 232 of bracket 232, (4) bottom surface 241 of inner leg 232, (5) edge 247 of outer leg 234, (6) upper surface 156 of outer leg 152 of bracket 150, (7) lower surface 158 of outer leg 152, (8) edge 172 of inner leg 154, (9) surface 55 of rear flange segment 56, (10) surface 57 of segment 56, (11) surface 135 of leg 134 of upper connector bracket 132, and (12) surface 137 of leg 134 (all twelve of which may be essentially parallel to one another) and any of (1) the top surface of plate segment 215, (2) the bottom surface of plate segment 215, (3) top surface 95 of lower flange 96 adjacent the front end thereof, (4) bottom surface 97 of lower flange 96 adjacent the front end thereof, (5) top surface 190 of bottom connector plate 180, and (6) bottom surface 192 of connector plate 180 (all six of which may be essentially parallel to one another).

As depicted in FIG. 4, table 22 may include a rigid table frame comprising left and right longitudinal rails 240 and 242 which may be laterally spaced from and essentially parallel to one another. Table 22 includes a front end 244 and a rear end 246. Front end 244 may be rearward of front end 30 of frame 20 and rear end 246 may be rearward of rear end 32 of frame 20. Pads 250 may be respectively atop rails 240 and 242. A plurality of rollers 252 may be rotatably mounted on each of rails 240 and 242. Outer edges 254 of rollers 252 may be laterally inward of inner edges 62 of left and right rails 48 and 50. The tops of rollers 252 may be lower than the top of front section 42 and the upper surface of front rail segments 54 of flanges 52 when table 22 is in the lowered home position. Left and right edges 254 may define a lateral width of table 22 along the front portion thereof such that said lateral width is less than inner width 66 of front section 42. That is, a front portion of table 22 may be laterally narrower than inner width 66 such that the front portion of table 22 may fit within space 117 between rails 48 and 50. Thus, the front portion of table 22 (including the front portion of the table frame/rails 240 and 242) may within space 117 in the lowered home position and outside or removed from space 117 in the tilted roll off position.

Table top 22 in the home and roll off positions may be positioned higher than the top of rear section 44 and the top of flanges 90 of rails 86 and 88. Left and right rails 240 and 242 may extend directly above rails 86 and 88 respectively in the home and roll off positions. Table or tabletop 22 may extend higher than the top of connector plates 132 and may have a portion that is directly between left and right plates 132. Portions of left and right rails 240 and 242 may extend directly above portions of left and right connector plate 132 legs 136 respectively.

Table top 22 may include downwardly extending pivot mounts 262 adjacent rear end 246. A pivot pin 264 may extend through apertures in pivot mounts 260 and 262 to pivotally mount table 22 on frame 20 adjacent the rear end of frame 20 so that table 22 is pivotable about an essentially horizontal laterally extending pivot axis of pivot 264 between the home and roll off positions to facilitate loading and unloading of container 18 onto and off of table top 22. Arms 26 or another suitable lift may be used to lift the front end of table 22 to pivot table 22 from the home position to the roll off position and to lower the front end of table 22 from the roll off position to the home position.

Container loading hydraulic system 28 and other aspects of trailer 10 are described in greater detail in the U.S. patent application filed on the same date as the present application and entitled "Roll Off Trailer Frame And Two Trolley Assemblies", which is incorporated herein by reference. System 28 may include a forward and rearward trollies or trolley assemblies, each of which may be movably mounted on the frame of table 22 to move forward and rearward along said frame. Only one trolley assembly 280 is shown in the figures although the other trolley assembly is described in the above-noted patent application.

System 28 may further include a cable 284, first and second hydraulic actuators 286 and 300, sheaves which may be rotatably mounted on the trollies, and a cable which may be wrapped around the sheaves. Each of actuators 286 and 300 may be longitudinally elongated and may be a piston-cylinder combination comprising a longitudinally elongated cylinder 382 and a longitudinally elongated piston 298 which is slidably received within cylinder 382 to move forward and rearward. Front portions of actuators 286 and 300 (including a portion of piston 298 and/or cylinder 382), a portion of cable 284, a portion of front trolley 280 and a portion of one or more sheaves mounted on front trolley 280 may be within space 117 when table 22 is in the home position and outside of space 117 when in the roll off position.

Various components of trailer frame 20 may be formed of a metal such as steel or an aluminum alloy, that is, an alloy which is primarily aluminum, for instance, hitch body 23, rails 48, 50, 86 and 88, cross structure 85, connector plates 132, 180 and 181, brackets 150 and 230, lateral plates 197 and 199, front plate 200 and rear plate 210. Various components of the table frame of table 22 may be formed of the same material, such as rails 240 and 242 and various cross structures which may extend between and be secured to rails 240 and 242. In various places throughout the present application, the term "secured to" may mean rigidly secured to and may be achieved, for instance, by welds between the given components or by other fasteners such as threaded bolts and threaded nuts which threadedly engage one another with the bolts extending from one of the given components to one or more of the other components.

It is noted that various components or terms having the same names described herein may be denoted as first, second, third and fourth components, etc. For instance, various flanges or flange segments may be denoted as first, second, third, fourth, fifth, sixth (etc) flanges or flange segments, or various webs may be denoted as first, second, third and fourth webs and so forth. Other such components may include, without limitation, rails, plates, plate segments, brackets, legs, panels, and so forth.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustrations are an example and not limited to the exact details shown or described.

The invention claimed is:

1. A trailer comprising:
   a trailer frame front section comprising left and right front longitudinal rails respectively having left and right sides defining therebetween a front section outer width;
   a trailer frame rear section comprising left and right rear longitudinal rails respectively having left and right sides defining therebetween a rear section outer width which is smaller than the front section outer width;
   a first front flange of the left front rail;
   a first rear flange of the left rear rail which extends to the right of the first front flange; and
   a first connector plate which extends between and is secured to the first front flange and the first rear flange.

2. The trailer of claim 1 wherein the first front flange is L-shaped as viewed from the side.

3. The trailer of claim 1 wherein the first front flange is S-shaped as viewed from the side.

4. The trailer of claim 1 wherein the left rear rail comprises a rear web having an upper edge; and the first rear flange is secured to the upper edge of the rear web.

5. The trailer of claim 1 wherein the left rear rail comprises a rear web having a lower edge; and the first rear flange is secured to the lower edge of the rear web.

6. The trailer of claim 1 wherein the first connector plate is V-shaped as viewed from the side.

7. The trailer of claim 1 wherein the first front flange comprises a first flange segment;
   the first rear flange comprises a second flange segment which extends at an angle to the first flange segment as viewed from the side;
   the first connector plate has a first leg and a second leg which extends at an angle to the first leg as viewed from the side;
   the first leg is secured to the first flange segment; and
   the second leg is secured to the first flange segment.

8. The trailer of claim 1 wherein the left front rail has a first front web;
   the first front flange is secured to an upper edge of the first front web;
   the left rear rail has a first rear web;
   the first rear flange is secured to an upper edge of the first rear web;
   a second front flange is secured to a lower edge of the first front web;
   a second rear flange is secured to a lower edge of the first rear web;
   a second connector plate extends between and is secured to the second front flange and the second rear flange.

9. The trailer of claim 8 wherein the first front flange includes a first flange segment;
   the first rear flange includes a second flange segment which extends at an angle relative to the first flange segment as viewed from the side;
   the second front flange includes a third flange segment;
   the second rear flange includes a fourth flange segment which is essentially parallel to the third flange segment;
   the first connector plate extends between and is secured to the first and second flange segments; and
   the second connector plate extends between and is secured to the third and fourth flange segments.

10. The trailer of claim 8 further comprising
    a left outer bracket having a first outer bracket leg secured to the first front flange and a second outer bracket leg secured to the first rear web;
    a neck section extending between the left and right rear rails;
    a left inner bracket having a first inner bracket leg secured to the first rear web and a second inner bracket leg secured to the neck section; and
    a portion of the first rear web directly between the second out bracket leg and the first inner bracket leg.

11. The trailer of claim 10 wherein the first front flange comprises an angled segment which angles downward and rearward from adjacent a front upper end of the angled segment to adjacent a lower rear end of the angled segment;
    the first connector plate extends between and is secured to the angled segment and the first rear flange;
    the first outer bracket leg is secured to the angled segment;
    the neck section comprises an angled plate which angles rearward and downward from adjacent a front upper end of the angled plate to adjacent a lower rear end of the angled plate; and
    the second inner bracket leg is secured to the angled plate.

12. The trailer of claim 11 wherein the neck section comprises a forward plate which is forward of the angled plate and which extends between the left and right front rails;
    the left rear rail has a front end which is closely adjacent or in contact with the forward plate.

13. The trailer of claim 1 further comprising
    a neck section which extends adjacent respective front ends of the rear rails and comprises a neck section plate which extends downward from adjacent an upper end of the neck section plate to adjacent a lower end of the neck section plate and which extends from adjacent the left rear rail to adjacent the right rear rail; and
    a left inner bracket which extends between and is secured to the left rear rail and the neck section plate.

14. The trailer of claim 13 further comprising a left outer bracket which extends between and is secured to the first front flange and the left rear rail.

15. The trailer of claim 1 wherein the left rear rail comprises a web;
    the first front flange comprises a flange segment which extends adjacent a rear end of the left front rail and which extends downward from adjacent an upper end of the flange segment to adjacent a lower end of the flange segment; and
    a left outer bracket extends between and is secured to the flange segment and the web of the left rear rail.

16. The trailer of claim 15 further comprising
    a neck section which extends between respective front portions of the left and right rear rails; and
    a left inner bracket which extends between and is secured to the left rear rail and the neck section.

17. The trailer of claim 1 further comprising
    a trailer frame neck section which comprises a neck section plate which extends from adjacent the left front rail to adjacent the right front rail; and
    a second connector plate which extends between and is secured to the neck section plate and the first rear flange adjacent a front end of the left rear rail.

18. The trailer of claim 1 further comprising
    a trailer frame neck section which extends adjacent the front ends of the rear rails and comprises a neck section plate which extends from adjacent the left rear rail to adjacent the right rear rail; and front ends of the rear rails closely adjacent or in contact with the neck section plate.

19. A trailer comprising:
a trailer frame front section comprising left and right front longitudinal rails respectively having left and right sides defining therebetween a front section outer width, the left front rail having a rear end;
a trailer frame rear section comprising left and right rear longitudinal rails respectively having left and right sides defining therebetween a rear section outer width which is smaller than the front section outer width, the left rear rail comprising a web;
a flange of the left front rail comprising a flange segment which extends adjacent the rear end of the left front rail and which extends downward from adjacent an upper end of the flange segment to adjacent a lower end of the flange segment rear rail;
a left bracket which extends between and is secured to the flange segment and the web of the left rear rail; and
a left connector plate that secures an upper surface of the front rail to an upper surface of the rear rail.

* * * * *